United States Patent
Kim et al.

(10) Patent No.: US 7,953,165 B2
(45) Date of Patent: May 31, 2011

(54) TRANSMITTING APPARATUS IN ORTHOGONAL FREQUENCY DIVISION MULTIPLEXING ACCESS SYSTEM CAPABLE OF CONTROLLING GAIN FOR VARIATION OF SUB-CHANNEL ALLOCATION AND METHOD FOR TRANSMITTING DATA THEREOF

(75) Inventors: Dae-Ho Kim, Daejeon (KR); Jun-Woo Kim, Daejeon (KR); Youn-Ok Park, Daejeon (KR)

(73) Assignees: Samsung Electronics Co., Ltd. (KR); Electronics and Telecommunications Research Institute (KR); KT Corporation (KR); SK Telecom Co., Ltd. (KR); KT Freetel Co., Ltd. (KR); Hanaro Telecom Inc. (KR)

( * ) Notice: Subject to any disclaimer, the term of this patent is extended or adjusted under 35 U.S.C. 154(b) by 671 days.

(21) Appl. No.: 11/667,938

(22) PCT Filed: Sep. 7, 2005

(86) PCT No.: PCT/KR2005/002959
§ 371 (c)(1),
(2), (4) Date: May 16, 2007

(87) PCT Pub. No.: WO2006/054826
PCT Pub. Date: May 26, 2006

(65) Prior Publication Data
US 2007/0291633 A1     Dec. 20, 2007

(30) Foreign Application Priority Data
Nov. 16, 2004   (KR) .................. 10-2004-0093568

(51) Int. Cl.
*H04K 1/10* (2006.01)
*H04L 27/28* (2006.01)
*H04L 27/00* (2006.01)

(52) U.S. Cl. ............................ 375/260; 375/259; 455/59
(58) Field of Classification Search .................... 375/260
See application file for complete search history.

(56) References Cited

U.S. PATENT DOCUMENTS
5,083,304 A * 1/1992 Cahill ........................... 375/345
6,295,272 B1 * 9/2001 Feldman et al. .............. 370/210
(Continued)

FOREIGN PATENT DOCUMENTS
EP     0955736 A2    10/1999
(Continued)

OTHER PUBLICATIONS
Subcarrier Allocation and power control for OFDMA, D. Kivanec et al., IEEE pp. 147-151.

*Primary Examiner* — David C. Payne
*Assistant Examiner* — Erin M File
(74) *Attorney, Agent, or Firm* — The Farrell Law Firm, P.C.

(57) ABSTRACT

The present invention relates to a transmitter of an OFDMA system capable of controlling a gain for variation of subchannel allocation, and a method thereof. The transmitter includes a subchannel number determining unit, a modulator, a digital/analogue converter, and a gain controller controlling the gain. The subchannel number determining unit determines the number of subchannels in use according to communication environments, and the modulator modulates transmission data with reference to the number of subchannels determined by the subchannel number determining unit and outputs the modulated transmission data. The digital/analogue converter converts the transmission data into analogue data and transmits the converted analogue data through a transmit antenna. The gain controller controls gains of the transmission data according to gain values corresponding to the number of subchannels.

12 Claims, 5 Drawing Sheets

U.S. PATENT DOCUMENTS

| | | | |
|---|---|---|---|
| 2001/0010684 A1* | 8/2001 | Willenegger et al. | 370/311 |
| 2003/0122614 A1* | 7/2003 | Gilbert | 327/560 |
| 2004/0142696 A1* | 7/2004 | Saunders et al. | 455/450 |
| 2004/0247038 A1* | 12/2004 | Uesugi et al. | 375/260 |
| 2005/0099937 A1 | 5/2005 | Oh et al. | |
| 2006/0056451 A1* | 3/2006 | Yano et al. | 370/468 |
| 2008/0143603 A1* | 6/2008 | Bornholdt | 342/387 |
| 2008/0304551 A1* | 12/2008 | Li et al. | 375/140 |

FOREIGN PATENT DOCUMENTS

| | | |
|---|---|---|
| EP | 1065804 A2 | 3/2001 |
| JP | 1999-0088052 | 12/1999 |
| JP | 2003-153335 | 5/2003 |
| KR | 1020030070218 A | 8/2003 |
| KR | 1020030075117 A | 9/2003 |
| WO | WO 02/49305 A2 | 6/2002 |

* cited by examiner

TRANSMITTING APPARATUS IN ORTHOGONAL FREQUENCY DIVISION MULTIPLEXING ACCESS SYSTEM CAPABLE OF CONTROLLING GAIN FOR VARIATION OF SUB-CHANNEL ALLOCATION AND METHOD FOR TRANSMITTING DATA THEREOF

TECHNICAL FIELD

The present invention relates to an orthogonal frequency division multiplexing access (OFDMA) system. More particularly, the present invention relates to a transmitter of an OFDMA system capable of controlling a gain for variation of subchannel allocation and a method thereof.

BACKGROUND ART

Various multiple access methods based on an orthogonal frequency division multiplexing. (OFDM) method have been studied as candidate methods for satisfying users who require a high-speed multimedia service for next generation mobile communication.

Among those methods, an orthogonal frequency division multiplexing access (OFDMA) method is for achieving multiple accesses by forming respective user data from subsets among a total of orthogonal sub-carriers based on the OFDM technique.

In addition, the OFDM method is one of effective frequency shift keying methods which is robust against a frequency selective fading channel. The OFDM method is for separating a high-speed serial signal into various low-speed parallel signals and allocating the separated low-speed parallel signals to respective orthogonal sub-carriers to transmit the signals.

Methods for allocating carriers in the OFDMA system have been disclosed in Korean Patent Publication No. 2003-0070218 "Pilot carrier allocation method in an orthogonal frequency division multiple access system", and No. 2003-0075117 "Adaptive pilot carrier allocation method and apparatus in an orthogonal frequency division multiple access system."

These methods are for improving phase error estimation performance, minimizing collision between subscribers, and optimizing the number of pilot carriers for a sub-channel.

In addition, a method relating to an algorithm for subcarrier allocation and power control is disclosed in "Subcarrier allocation and Power Control for OFDMA", 34th Asilomar Conference, Vol. 1, pp. 147-151, Oct. 30, 2000, by Kivanc D et al, in which total power consumption is minimized based on a bit error rate and a data rate.

Specifically, a modulator in a transmitter of the OFDMA system loads data to carriers of subchannels in use, inverse Fourier transforms the data, and transmits the inverse Fourier transformed data to a receiver (e.g., a wireless terminal) through a transmit antenna.

At this time, the number of subchannels used by the transmitter may be varied according to communication environments between the transmitter and receiver, and a maximum output value of an inverse Fourier transformer of the modulator is also varied according to the variation of the subchannel allocation.

That is, a digital/analogue converter converts the output of the modulator into analogue data and transmits the converted analogue data to the transmit antenna, and an entire dynamic range of the digital/analogue converter may not be used effectively when the maximum output value of the modulator is varied according to the variation of the subchannel allocation. Therefore, a problem occurs in that entire performance of the OFDMA transmitter is reduced since noise is relatively varied and a signal to noise ratio of a transmitter output end is varied.

The above information disclosed in this Background of the Invention section is only for enhancement of understanding of the background of the invention and therefore, it should not be understood that all the above information forms the prior art that is already known in this country to a person or ordinary skill in the art.

DISCLOSURE OF INVENTION

Technical Problem

The present invention provides a transmitter of an OFDMA system capable of preventing the reduction of an output and a signal to noise ratio of a transmission signal by controlling a gain of a maximum output value of an inverse Fourier transformer which is varied according to the number of subchannels, and a method for transmitting data thereof.

Technical Solution

An exemplary transmitter of an OFDMA system capable of controlling a gain for variation of subchannel allocation according to an embodiment of the present invention includes a subchannel number determining unit for determining the number of subchannels in use according to the communication environments, a modulator for modulating transmission data with reference to the number of subchannels determined by the subchannel number determining unit and outputting the modulated transmission data, a digital/analogue converter for converting the transmission data outputted from the modulator into analogue data and transmitting the converted analogue data through a transmit antenna, and a gain controller for controlling gains of the transmission data inputted from the modulator to the digital/analogue converter according to gain values corresponding to the number of subchannels determined by the subchannel number determining unit.

At this time, the gain value is determined as a value for compensating the output value of the modulator varied according to the number of subchannels when the number of subchannels in use is maximized, such that a maximum output value of the modulator and the output value of the modulator varied according to the variation of the number of subchannels correspond to each other.

In addition, a variation range of the number of subchannels is divided into more than two groups, and representative gain values for the respective divided groups are allocated to the number of subchannels in groups corresponding to the representative gain values.

The gain values allocated to the respective groups have values as exponential powers of 2.

In a method for transmitting data in an orthogonal frequency division multiplexing access system capable of varying the number of subchannels in use according to a communication environment, a) transmission data are modulated with reference to the number of subchannels determined according to the communication environment; b) a gain of the modulated transmission data is controlled according to a gain value corresponding to the determined number of subchannels; and c) the gain controlled transmission data are converted into analogue data and the converted analogue data are wirelessly transmitted.

Advantageous Effects

According to the present inventions an output value of a modulator may be maintained to be constant by controlling an output value of an inverse Fourier transformer according to variation of subchannel allocation.

In addition, performance degradation may be eliminated by using the entire dynamic range of a digital/analogue converter and maintaining a signal to noise ratio of a transmission signal to be predetermined.

BEST MODE FOR CARRYING OUT THE INVENTION

In the following detailed description, only certain exemplary embodiments of the present invention have been shown and described, simply by way of illustration.

As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

An embodiment of the present invention will hereinafter be described in detail with reference to the accompanying drawings. An OFDMA system capable of controlling gain values according to variation of subchannel allocation in an exemplary embodiment of the present invention will be described with reference to figures.

Figure 1:
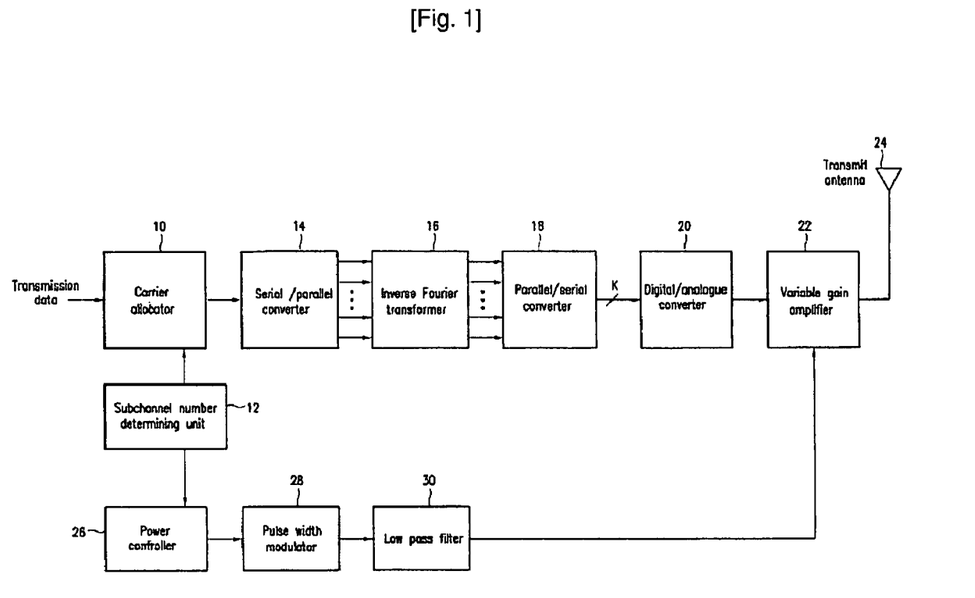
FIG. 1 shows a block diagram for representing a transmitter of a conventional OFDMA system.

FIG. 1 shows a block diagram for representing a transmitter of a conventional orthogonal frequency division multiplexing access (OFDMA) system.

As shown in FIG. 1, a carrier allocator 10 allocates carriers to transmission data with reference to the number of subchannels determined by a subchannel number determining unit 12 in the transmitter of the conventional OFDMA system. The transmission data allocated to the carriers are converted into parallel data by a serial/parallel converter 14, inverse Fourier transformed by an inverse Fourier transformer 16, converted into serial data by a parallel/serial converter 18, and then inputted to a digital/analogue converter (DAC) 20.

The DAC 20 converts the serial data inputted from the parallel/serial converter 18 into the analogue data and outputs the analogue data through a transmit antenna 24.

At this time, a maximum output value of the inverse Fourier transformer 16 is varied when the number of subchannels in use is varied according to communication environments. That is, a dynamic range of the DAC may be used ineffectively when the output value of the inverse Fourier transformer 16 according to the variation of the number of subchannels is varied. The maximum output value of the inverse Fourier transformer 16 is required to correspond to a maximum input value of the DAC in order to minimize quantization and thermal noise generated in the DAC in a digital/analogue converting process. However, the maximum output value of the modulator is used within a range which is equal to or less than the maximum input value of the DAC when the maximum number of subchannels is operated since it is impossible to control the maximum output value of the inverse Fourier transformer 16 to correspond to the maximum input value of the DAC, and a serious distortion is caused by saturation when the output value of the inverse Fourier transformer 16 is greater than the maximum output value of the DAC At this time, a problem occurs in that a transmission power of an antenna output end is reduced and a signal to noise ratio (SNR) of the output of the DAC is also reduced since the output of the inverse Fourier transformer 16 is reduced by reduction of the number of subchannels in the above condition.

To prevent the problem, a variable gain amplifier 22 is provided between the DAC and the transmit antenna 24, and a power control value outputted from the power controller 26 for controlling compensation by increasing a gain of the variable gain amplifier 22 according to the variation of the number of subchannels is modulated by a pulse width modulator 28, filtered by a low pass filter 20, and inputted to the variable gain amplifier 22 so that the reduction of the output value of the DAC may be compensated.

The reduction of the transmission power caused by the reduction of the number of subchannels may be compensated by increasing the gain of the variable gain amplifier 22 by operating the power controller 26. However, a power control algorithm may be complicated since the gain of the variable gain amplifier 22 is to be varied according to the variation of the subchannel allocation. That is, when the number of subchannels is reduced, the output value of the inverse Fourier transformer 16 is reduced and an SNR and amplitude of the output of the DAC are reduced. Therefore, the power control algorithm is problematically complicated in a process for compensating the amplitude reduction.

In the OFDMA system, (T−G) carriers obtained by subtracting G guard carriers in disuse from a total T of carriers in use are grouped into groups of N carriers to be named as subchannels, and channel allocations for respective users are performed for the respective subchannels. Accordingly, the number S of the subchannels is obtained as (T−G)/N. For example, T=2048, G=352, and N=53 in an uplink of an 802.16a system, and therefore the number of subchannels obtained is S=(2048−352)/53=32. That is, the uplink of the 802.16a system uses 32 subchannels, and 53 carriers for each subchannel.

Figure 2:
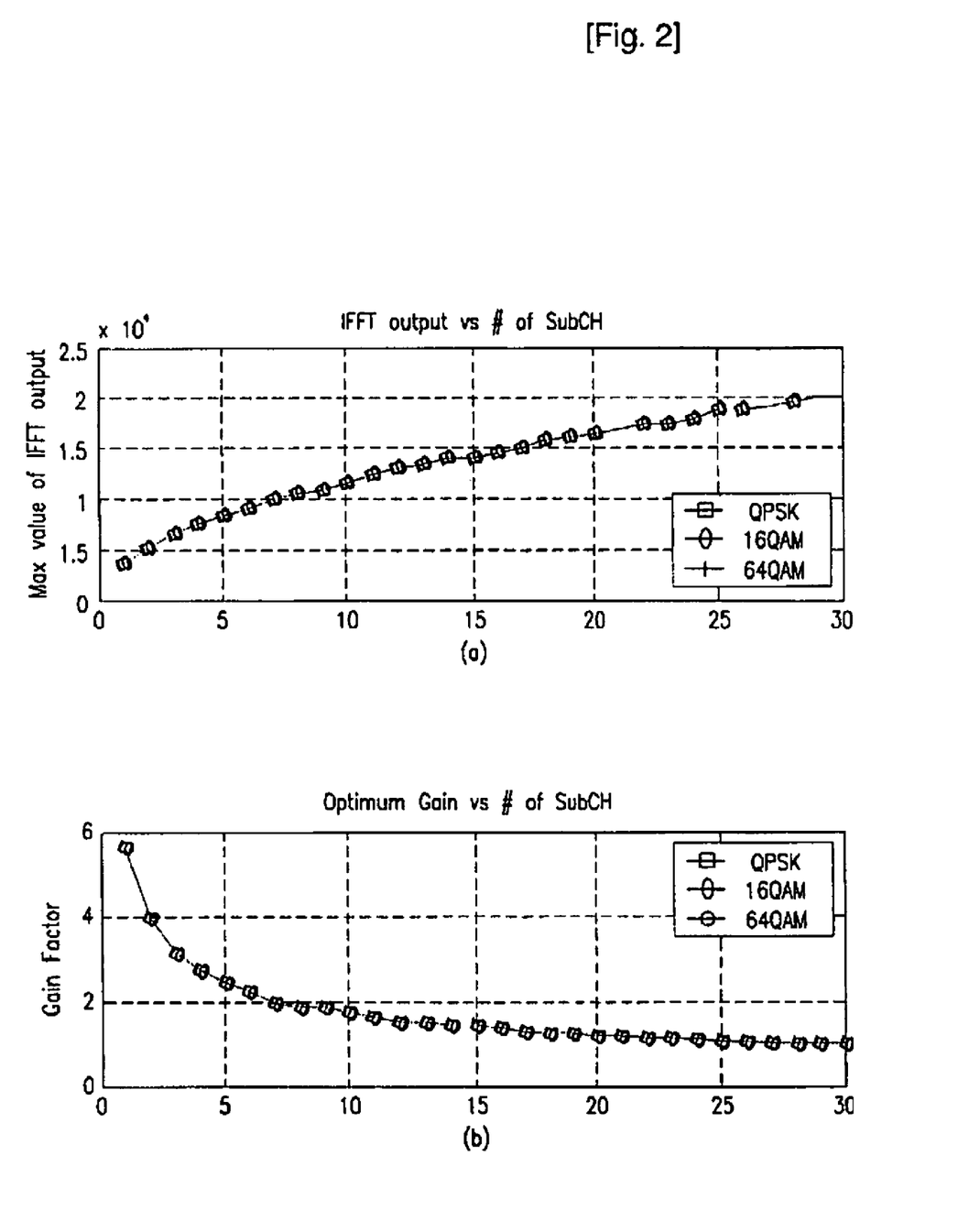
FIG. 2(a) shows a graph for representing maximum output values of an inverse Fourier transformer according to variation of subchannel allocation in the conventional OFDMA system for respective modulation methods.
FIG. 2(b) shows a graph for representing gain values for compensating reduction of the maximum output values.

FIG. 2 shows the maximum output value of the inverse Fourier transformer according to the variation of the number of subchannels and a gain value for compensating the reduction of the maximum output value in the 802.16a system.

FIG. 2(a) shows a graph for representing the maximum output values of the inverse Fourier transformer according to the variation of the number of subchannels in the conventional OFDMA system for respective modulation methods, and FIG. 2(b) shows a graph for representing gain values for compensating reduction of the maximum output values.

As shown in FIG. 2(a), the maximum output value of the inverse Fourier transformer 16 is increased as the number of subchannels is increased regardless of modulation methods. For example, the maximum output value is outputted when the number of subchannels is 30, and the maximum output value is reduced close to 0 as the number of subchannels reaches close to 0.

In addition, the maximum output value of the inverse Fourier transformer 16 (i.e., the maximum output value when the number of subchannels is 30) is required to be inputted to the DAC 20, and therefore compensation for increasing the gain of the output value of the inverse Fourier transformer 16 is required to be performed as shown in FIG. 2(b) when the number of subchannels is reduced.

As shown in FIG. 2(b), a slope of a gain curve is steep when the number of subchannels is less than 10, and the same is gentle when number of subchannels is greater than 10. Actually, the number of subchannels used in the uplink is less than 10 in most cases, and therefore the SNR of the transmission signal is inappropriate since the dynamic range of the DAC may be used ineffectively. That is, the gain control shown in FIG. 2(b) is performed by the variable gain amplifier 22 according to a control of the power controller 26 when the number of subchannels is reduced, and therefore the transmission output is controlled to correspond to the output in a case that the maximum number of subchannels is allocated. However, in actually realizing hardware, it is a problem in that a gate size, power consumption, and number of bits of an output end of a multiplier are increased when the multiplier is used in the variable gain amplifier 22 in order to multiply the output of the DAC 20 by a gain value outputted from the low pass filter 20 in the variable gain amplifier 22.

To solve the problem in the exemplary embodiment of the present invention, the gain of the output of the inverse Fourier transformer is controlled such that the maximum value of the inverse Fourier transformer output outputted to the digital/analogue converter may correspond to the maximum output value in the case that the maximum number of subchannels is allocated.

Figure 3:
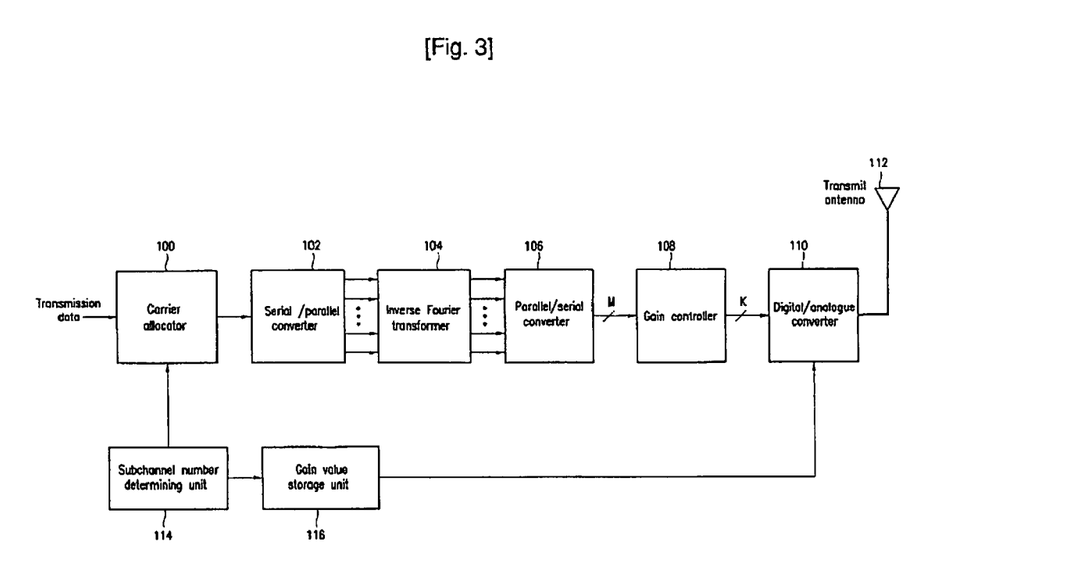
FIG. 3 shows a block diagram for representing an OFDMA system capable of controlling gain values according to variation of the subchannel allocation according to an exemplary embodiment of the present invention.

FIG. 3 shows a block diagram for representing an OFDMA system capable of controlling gain values by the variation of the number of subchannels according to the exemplary embodiment of the present invention.

As shown in FIG. 3, the OFDMA system capable of controlling gain values by the variation of the subchannel allocation according to the exemplary embodiment of the present invention includes a carrier allocator 100, a serial/parallel converter 102, an inverse Fourier transformer 104, a parallel/serial converter 106, a gain controller 108, a digital/analogue converter 110, a transmit antenna 112, a subchannel number determining unit 114, and a gain value storage unit 116.

The carrier allocator 100 allocates carriers to transmission data according to the number of subchannels determined by the subchannel number determining unit 114. At this time, the OFDMA system according to the exemplary embodiment of the present invention is capable of varying the number of subchannels in use according to communication environments, and the communication environments are determined by using various parameters estimated by a transmitter or a receiver, which is well known to those skilled in the art, and therefore further detailed descriptions will be omitted.

Accordingly, the subchannel number determining unit 114 determines the number of subchannels according to the communication environments, and transmits the number to the carrier allocator 100 so as to perform carrier allocation for the transmission data.

The serial/parallel converter 102 receives carrier allocated transmission data from the carrier allocator 100 and converts the data into parallel data, and the inverse fast Fourier transformer 104 inverse fast Fourier transforms the parallel data outputted from the serial/parallel converter 102.

The parallel/serial converter 106 converts the data outputted from the inverse Fourier transformer 104 into serial data.

The gain value storage unit 116 stores gain values respectively corresponding to the number of subchannels in the transmitter of the OFDMA system according to the exemplary embodiment of the present invention, and finds gain values corresponding to the number of subchannels determined by the subchannel number determining unit 114. At this time, the gain value storage unit 116 stores gain values for compensating the maximum output value of the inverse Fourier transformer 104 varied according to the variation of the subchannel allocation to be a maximum output value of the inverse Fourier transformer 104 outputted in a case of the maximum number of subchannels.

The gain controller 108 controls the serial data outputted from the parallel/serial converter 106 with reference to the gain value outputted from the gain value storage unit 116. Accordingly, a maximum output value of the serial data outputted from the gain controller 108 is maintained to correspond to the maximum output value of the inverse Fourier transformer 104 in the case of the maximum number of subchannels.

The digital/analogue converter 110 converts the serial data outputted from the gain controller 108 into analogue data, and the transmit antenna 112 externally transmits the analogue data.

The carrier allocator 100, serial/parallel converter 102, inverse Fourier transformer 104, and parallel/serial converter 106 together form a modulator for modulating the number of subchannels by varying the number used in the OFDMA system of the exemplary embodiment of the present invention according to the communication environment.

In addition, the gain value storage unit 116 and gain controller 108 form a gain controller for controlling the gain of the transmission data inputted from the modulator to the digital/analogue converter 110.

The gain value storage unit 116 may respectively store the gain values corresponding to the number of subchannels as shown in FIG. 2(b) when the number of subchannels is varied from 1 to 30 in the uplink of the 802.16a system.

However, the variation of the output value of the inverse Fourier transformer 104 according to the variation of the number of subchannels is not linear as shown in FIG. 2(a). For example, the variation of the output value of the inverse Fourier transformer 104 is not large when the number of subchannels is greater than 10, but it is wasteful configuration of a system to control the gain of the output of the inverse Fourier transformer 104 by storing the gain values for all the variations in the gain value storage unit 116 because the variation is large when the number of subchannels is less than 10. Accordingly, the gain value control may be performed by grouping the gain values according to the variation of the subchannel allocation into several groups based on ranges having a linear interval.

For example, referring to the uplink of the 802.16a system, the gain values according to the variation of the subchannel allocation are grouped into respective groups having 1-3, 4-10, and 11-40 subchannels, and respective gain values of the groups are determined as representative gain values. Accordingly, an algorithm for controlling the gain value according to the variation of the number of subchannels is simplified because it is not required to store the respective gain values by determining the gain vales for all the variations of the number of subchannels.

Figure 4:
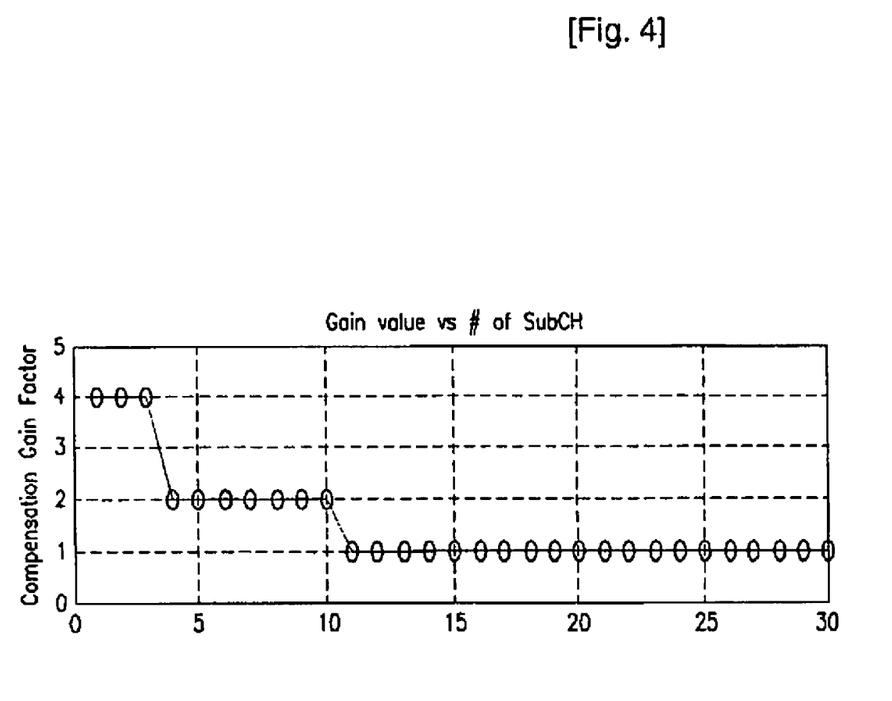
FIG. 4 shows a graph for representing gain values established according to the variation of the subchannel allocation in the OFDMA system shown in FIG. 3.

In addition, the gain values applied to the respective groups are quantized as exponential powers of 2 so as not to use the multiplier according to the exemplary embodiment of the present invention, because the same problem as in the prior art may occur in a case that the multiplier is used when the gain controller 108 applies the gain value outputted by the gain value storage unit 116 to the data outputted by the parallel/serial converter 106. For example, a configuration of the gain controller 108 is simplified and the power consumption is reduced since a multiplexer (MUX) is used without using the multiplier by applying gain values of 4, 2, and 1 which are the exponential powers of 2 to the three groups. As described, the range of the number of subchannels is divided into the three groups, and the gain values as the exponential powers of 2 are allocated to the respective groups, which is shown in FIG. 4.

Output bits of the gain controller 108 realized by using the multiplexer when the divided groups and gain values thereof are used are shown in [Table 1], where K denotes the number of input bits of the digital/analogue converter 110 and M denotes the number of output bits of the parallel/serial converter 106.

TABLE 1

| Number of subchannels | Gain value | Output of gain controller |
|---|---|---|
| 1~3 | 4 | M-2~(M-K − 1) |
| 4~10 | 2 | M-1~(M-K) |
| 11~30 | 1 | M~(M-K + 1) |

An operation of the OFDMA system capable of controlling gain values according to the variation of the subchannel allocation in the exemplary embodiment of the present invention will be described.

Carriers are allocated to transmission data for respective subchannels of respective users by the carrier allocator 100. At this time, the carrier allocator 100 allocates the carriers with reference to the number of subchannels determined by the subchannel number determining unit 114 according to the communication environment. For example, a large number of subchannels may be used in a good communication environment, but the number of subchannels is reduced when the communication environment is deteriorated.

The carrier allocated transmission data which are serial data of a frequency axis are converted into parallel data by the serial/parallel converter 102 in order to inverse Fourier transform the parallel data into the parallel data of a time axis by the inverse Fourier transformer 104.

The inverse Fourier transformed parallel data is converted to the M-bit serial data by the parallel/serial converter 106 and outputted to the gain controller 108.

The gain value storage unit 116 receives the number of subchannels determined by the subchannel number determining unit 114, finds gain values corresponding to the number of subchannels, and outputs the gain values to the gain controller 108. That is, a gain value of the group including the number of subchannels determined by the subchannel number determining unit 114 is subsequently outputted to the gain controller 108 since the gain value storage unit 116, as described with reference to Table 1, divides the number of subchannels into several groups, and stores the respective representative gain values for the respective divided groups. Referring to Table 1, the gain value storage unit 116 outputs a gain value of 4 to the gain controller 108 when the number of subchannels is determined to be 2. While the uplink of the 802.16a OFDMA system has been exemplified, it is highly understandable for those skilled in the art that the communication system varying the number of subchannels according to the communication environment may use one representative gain value of an exponential power of 2 after dividing the gain values for compensating the output of the inverse Fourier transformer 104 into several groups according to the variation of the number of subchannels.

The M-bit serial data inputted to the gain controller 108 is outputted after controlling the gain of the M-bit serial data according the gain values outputted from the gain value storage unit 116. That is, the gain of the M-bit serial data may be controlled by selecting and outputting the M output bits inputted from the parallel/serial converter 106 according to the gain value as the exponential power of 2 since the gain controller 108 includes the multiplexer (MUX).

For example, as shown in Table 1, bits selected and outputted from the gain controller 108 are (M−2) to (M−2−K) bits since the gain value is 4 when the data outputted from the parallel/serial converter 106 are M bits and the number of subchannels is 1 to 3, and the bits selected and outputted from the gain controller 108 are M to (M−K) bits since the gain value is 2 when the number of subchannels is 4 to 10. The bits selected and outputted from the gain controller 108 are M to (M−K) bits since the gain value is 1 when the number of subchannels is 11-30.

As described, the serial data outputted after controlling the gain by the gain controller 108 are converted into the analogue data by the digital/analogue converter 110, and transmitted through the transmit antenna 112.

At this time, the output of the serial data controlled by the gain controller 108 corresponds to the data outputted from the inverse Fourier transformer 104 through the parallel/serial converter 106 when the maximum number of subchannels is allocated.

Accordingly, the data corresponding to the maximum output value of the data outputted from the inverse Fourier transformer 104 through the parallel/serial converter 106 may be inputted to the digital/analogue converter 110 when the maximum number of subchannels is allocated regardless of the variation of the number of subchannels in use according to the variation of the communication environment. Accordingly, the quantization and thermal noises generated on a digital/analogue converting process may be minimized since the dynamic range of the digital/analogue converter 110 may be used effectively.

Figure 5:
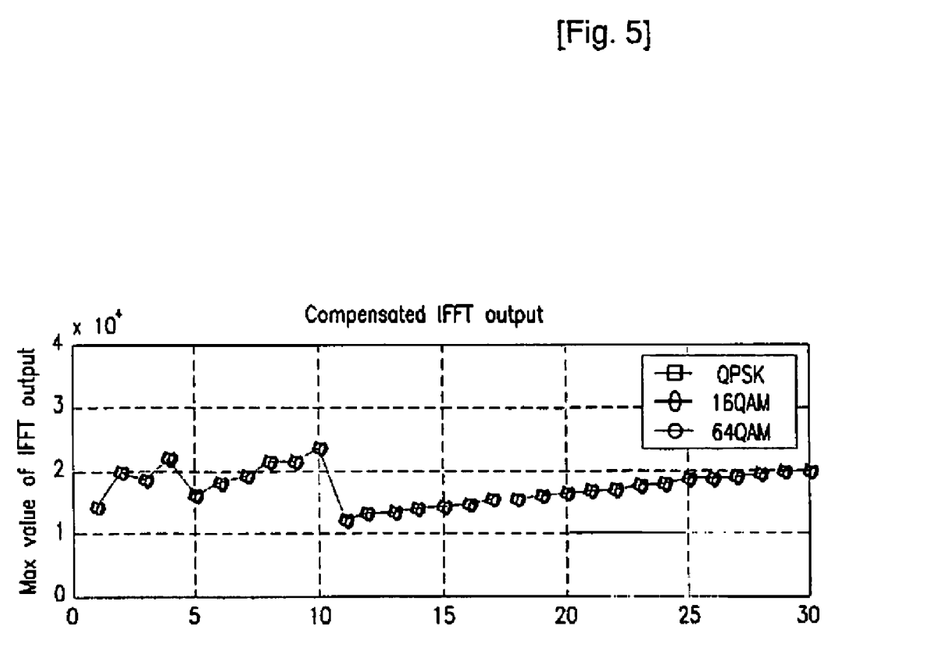
FIG. 5 shows a graph for representing values compensated by controlling the gain values according to the subchannel allocation in the OFDMA system shown in FIG. 3.

FIG. 5 shows a graph for representing values compensated by controlling the gain values according to the number of subchannels in the OFDMA system shown in FIG. 3.

As shown in FIG. 5, values may be irregularly varied around boundaries dividing ranges of the number of subchannels when controlling the gain values according to the variation of the subchannel allocation in the OFDMA system, but for the most part, the values are neighboring the maximum output value in a case of using the maximum number of subchannels.

In addition, a ratio of maximum and minimum values among the maximum output values of the inverse Fourier transformer 104 according to the variation of the number of subchannels is given as Math Figure 1.

MathFigure 1

$$\rho = \frac{\text{Max}\{\text{Max}(IFFT(k))_n\}}{\text{Min}\{\text{Max}(IFFT(k))_n\}},$$

where k denotes an IFFT index, in which k=0, 1, 2, . . . , K−1, and n denotes the number of subchannels, in which n=1, 2, . . . , N.

In a case that Math Figure 1 is applied to the conventional method shown in FIG. 2(a), ρ reaches close to 6 when the gain value is not controlled according to the variation of the subchannel allocation. Therefore, a 2.5 input bit of the DAC 20 is not used, the SNR is reduced, and the transmission power is approximately reduced by 18.5 dB.

However, ρ is reduced to 1.8 as shown in FIG. 5 when the gain is controlled according to the variation of the subchannel allocation according to the exemplary embodiment of the present invention.

Accordingly, when the gain is controlled according to the variation of the number of subchannels in use, the output of the modulator is constant regardless of the number of subchannels, the SNR is not reduced because all the dynamic ranges of the digital/analogue converter 110 are used, and the transmission output is barely varied.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A transmitter of an orthogonal frequency division multiple access system capable of varying a number of subchannels in use according to communication environments, the transmitter comprising:
a subchannel number determining unit for determining the number of subchannels to be allocated to transmission data according to the communication environments;
a modulator for modulating the transmission data with reference to the number of subchannels determined by the subchannel number determining unit, and outputting modulated transmission data;
a digital/analogue converter for converting the modulated transmission data outputted from the modulator into analogue data and transmitting the analogue data through a transmit antenna; and
a gain controller for controlling gains of the modulated transmission data inputted from the modulator to the digital/analogue converter according to gain values corresponding to the number of subchannels determined by the subchannel number determining unit, wherein the gain values are determined according to the number of subchannels so that values of the modulated transmission data inputted from the modulator to the digital/analogue converter are constant;
wherein each of the gain values is determined as values for compensating values of the modulated transmission data outputted from the modulator, which is varied according to the number of subchannels, so that the values of the modulated transmission data outputted from the modulator correspond to a maximum output value of the modulator when the number of subchannels is maximized, and wherein the maximum output value corresponds to a maximum input value of the digital/analogue converter.

2. The transmitter of claim 1, wherein the modulator comprises:
a carrier allocator for allocating carriers to the transmission data with reference to the number of subchannels determined by the subchannel number determining unit;
a serial/parallel converter for receiving the transmission data from the carrier allocator, converting the transmission data into parallel data, and outputting the parallel data;
an inverse Fourier transformer for inverse Fourier transforming the parallel data outputted from the serial/parallel converter into inverse Fourier transformed data, and outputting the inverse Fourier transformed data; and
a parallel/serial converter for converting the inverse Fourier transformed data into serial data, and outputting the serial data.

3. The transmitter of claim 1, wherein the gain controller comprises:
a gain value storage unit for storing the gain values corresponding to the number of subchannels determined by the subchannel number determining unit; and
a gain controller unit provided between the modulator and the digital/analogue converter, wherein the gain controller controls the gains of the modulated transmission data inputted from the modulator to the digital/analogue converter by using the gain values outputted from the gain value storage unit.

4. The transmitter of claim 1, wherein
a range of values for the number of subchannels is divided into more than two groups, and a different representative gain value is assigned to each group for allocation to the numbers of subchannels in each respective group.

5. The transmitter of claim 4, wherein the gain values allocated to the respective groups have values as exponential powers of 2.

6. The transmitter of claim 4, wherein 30 values are grouped into three groups when the orthogonal frequency division multiplexing access system maximally uses 30 subchannels.

7. The transmitter of claim 6, wherein
the three groups comprise ranges from 1 to 3, 4 to 10, and 11 to 30 subchannels.

8. The transmitter of claim 5, wherein 1, 2, and 4 are allocated as the gain values corresponding to the number of subchannels in the respective groups when the range of values for the number of subchannels is divided into three groups.

9. The transmitter of claim 3, wherein the gain controller comprises a multiplexer for multiplexing the modulated transmission data outputted from the modulator according to the gain value outputted from gain value storage unit, and outputting multiplexed transmission data.

10. A method for transmitting data in an orthogonal frequency division multiple access system capable of varying a number of subchannels according to a communication environment, the method comprising the steps of:
a) modulating transmission data with reference to the number of subchannels determined for allocation to the transmission data according to the communication environment;
b) controlling a gain of the modulated transmission data according to a gain value corresponding to the determined number of subchannels, wherein the gain value is determined according to the number of subchannels so that output values of the modulated transmission data are constant; and
c) converting the gain controlled transmission data into analogue data and wirelessly transmitting the analogue data;
wherein each of the gain values is determined as values for compensating values of the modulated transmission data outputted from a modulator, which is varied according to the number of subchannels, so that the values of the modulated transmission data outputted from the modulator corresponds to a maximum output value of the modulator when the number of subchannels is maximized, and wherein the maximum output value corresponds to a maximum input value of a digital/analogue converter.

11. The method of claim 10, wherein a range of values for the number of subchannels is divided into more than two groups, and a different gain value is assigned to each group for allocation to the numbers of subchannels in each respective group after the representative gain values are determined as exponential powers of 2.

12. The method of claim 11, wherein, the gain is controlled by multiplexing the modulated transmission data with reference to the gain value allocated to the number of subchannels.

* * * * *